United States Patent
Haas et al.

(10) Patent No.: US 11,827,522 B2
(45) Date of Patent: Nov. 28, 2023

(54) PARTIALLY HYDROGENATED CHLOROSILANES AND METHODS FOR PREPARING SAME BY SELECTIVE HYDROGENATION

(71) Applicant: Evonik Operations GmbH, Essen (DE)

(72) Inventors: Michael Haas, Graz (AT); Harald Stüger, Graz (AT); Thomas Lainer, Graz (AT); Odo Wunnicke, Muenster (DE); Michael Holthausen, Haltern am See (DE)

(73) Assignee: Evonik Operations GmbH, Essen (DE)

( * ) Notice: Subject to any disclaimer, the term of this patent is extended or adjusted under 35 U.S.C. 154(b) by 407 days.

(21) Appl. No.: 17/250,268

(22) PCT Filed: Jun. 7, 2019

(86) PCT No.: PCT/EP2019/064918
§ 371 (c)(1),
(2) Date: Dec. 22, 2020

(87) PCT Pub. No.: WO2020/001955
PCT Pub. Date: Jan. 2, 2020

(65) Prior Publication Data
US 2021/0261419 A1    Aug. 26, 2021

(30) Foreign Application Priority Data
Jun. 29, 2018  (EP) .................... 18180840

(51) Int. Cl.
*C01B 33/107*    (2006.01)

(52) U.S. Cl.
CPC .. *C01B 33/10715* (2013.01); *C01B 33/10778* (2013.01)

(58) Field of Classification Search
CPC ................................ C01B 33/10778
See application file for complete search history.

(56) References Cited

U.S. PATENT DOCUMENTS 8,575,381 B2   11/2013   Arkles et al.
9,011,812 B2    4/2015   Brausch et al.
(Continued)

FOREIGN PATENT DOCUMENTS

DE   10 2009 053 804   3/2011
JP       2020504362    2/2020
(Continued)

OTHER PUBLICATIONS

Fritzsche et al. Main Group Met. Chem. 2015, 38, 69-74 (Year: 2015).*

(Continued)

*Primary Examiner* — Anthony J Zimmer
*Assistant Examiner* — Jordan W Taylor
(74) *Attorney, Agent, or Firm* — Grüneberg and Myers PLLC

(57) ABSTRACT

A method is useful for preparing partially hydrogenated chlorosilanes by selective hydrogenation with a compound of the formula $R_2AlH$, wherein R is a branched or cyclic hydrocarbon. Partially hydrogenated chlorosilanes can be prepared with said method, in particular partially hydrogenated chlorosilanes represented by the formula $Cl_3SiSi(SiH_3)_3$, $(Cl_3Si)_2Si(SiH_3)_2$ or $HSi(SiH_3)_2SiCl_3$.

19 Claims, 4 Drawing Sheets

(56) References Cited

U.S. PATENT DOCUMENTS

| | | | |
|---|---|---|---|
| 9,017,630 | B2 | 4/2015 | Wieber et al. |
| 2004/0224089 | A1* | 11/2004 | Singh .................... C01B 33/107 427/255.393 |

FOREIGN PATENT DOCUMENTS

| | | | |
|---|---|---|---|
| WO | 2004/036631 | | 4/2004 |
| WO | 2008/051328 | | 5/2008 |
| WO | WO-2008051328 | A1 * | 5/2008 ............. C01B 33/04 |
| WO | 2012/084897 | | 6/2012 |
| WO | 2019/005571 | | 1/2019 |
| WO | 2019027906 | A1 | 2/2019 |

OTHER PUBLICATIONS

Herzog et al. (J. Organomet. Chem., 1997, 544, 217-223) (Year: 1997).*

Fehér et al., "*Halogenierung von höheren Silanen mit Zinn(IV)— chlorid bzw. Quecksilber(II)-chlorid*", Z. anorg. allg. Chem., 1984, vol. 515, pp. 36-40 (11 pages with English Translation).

Haas et al., "*Branched Hydrosilane Oligomers as Ideal Precursors for Liquid-Based Silicon-Film Deposition*", Angew. Chem. Int. Ed., 2017, vol. 56, pp. 14071-14074.

Harald Stüger, "*Synthese 1,4-disubstituierter Tetrasilane durch selektive Spaltung von Si-Phenyl-Bindungen*", Journal of Organometallic Chemistry, 1992, vol. 433, pp. 11-19 (20 pages with English Translation).

Hassler et al., "*Syntheses, Infrared and Raman Vibrational Spectra, Normal Coordinate Analyses and $^{29}$Si-NMR-Spectra of Halogenated Disilanes $X_nSi_2H_{6-n}$ (X=F, Cl, Br, I)*", Journal of Molecular Structure, 1995, vol. 348, pp. 353-356.

International Search Report dated Aug. 21, 2019 in PCT/EP2019/064918, 6 Pages.

Written Opinion dated Aug. 21, 2019 in PCT/EP2019/064918, 8 Pages.

Fritzsche et al., "The disilanes Cp*SiCl$_2$SiH$_3$ and Cp*SiH$_2$SiH$_2$Cp*", Main Group Met. Chem., vol. 38, No. 3-4, 2015, pp. 69-74.

Bentham et al., "Stannic Chloride: A Selective Chlorinating Agent For Silanes And Germanes", Inorg. Nucl. Chem. Letters, 1971, vol. 7, Issue 11, pp. 1077-1079.

Drake et al., "Halogenodisilanes", Inorg. Phys. Theor., 1970, pp. 2587-2590.

Drake et al., "Halogenosilanes. Part III. Fluoro-, Chloro-, and Bromo-derivatives of Trisilane", Inorg. Phys. Theor., 1971, pp. 3305-3308.

Fehér et al., "Halogenierung von höheren Silanen mit Zinn(IV) - chlorid bzw. Quecksilber(II) -chlorid", Z. anorg. allg. Chem., 1984, vol. 515, pp. 36-40 (11 p. with English Translation).

Gaspar et al., "Preparation of Trisilane by the Schlesinger Method", Inorganic Chemistry, 1970, pp. 1272-1273.

Haas et al., "Branched Hydrosilane Oligomers as Ideal Precursors for Liquid-Based Silicon-Film Deposition", Angew. Chem. Int. Ed., 2017, vol. 56, p. 14071- 14074.

Hollandsworth et al., "Chlorodisilanes. Preparation and Silicon-Hydrogen Stretching Frequencies", Inorganic Chemistry, Aug. 1968, vol. 7, No. 8, pp. 1635-1637.

Harald Stuger, "Lineare Tetrasilane mit mittelständigen Substituenten-Oligosilane mit optischer Aktivität", Journal of Organometallic Chemistry, 1993, vol. 458, pp. 1-7.

Harald Stüger, "Synthese 1,4-disubstituierter Tetrasilane durch selektive Spaltung von Si-Phenyl-Bindungen", Journal of Organometallic Chemistry, 1992, vol. 433, pp. 11-19 (20 p. with English Translation).

Hassler et al., "Chlor-, Brom- und Iodtrisilane: Synthesen und Si-Kernresonanzspektren", Journal of Organometallic Chemistry, 1997, vol. 540, pp. 113-118.

Hassler et al., "Syntheses, Infrared and Raman Vibrational Spectra, Normal Coordinate Analyses and $^{29}$Si-NMR-Spectra of Halogenated Disilanes XnSi2H6-n (X = F, Cl, Br, I)", Journal of Molecular Structure, 1995, vol. 348, pp. 353-356.

Herzog et al., "Katalytische Hydrierung chlorhaltiger Disilane mit Tributylstannan", Journal of Organometallic Chemistry, 1995, vol. 494, pp. 143-147.

Höfler et al., "Zur kenntnis des neopentasilans", Inorg. Nucl. Chem. Letters, 1973, vol. 9, pp. 723-725.

International Search Report issued Aug. 21, 2019 in PCT/EP2019/064918, 6 Pages.

Patzold et al., "Katalytische Hydrierung von Halogenmonosilanen mit Tributylzinnhydrid", Journal of Organometallic Chemistry, 1996, vol. 508, pp. 147-152.

Shriver et al., "The Manipulation of Air-Sensitive Compounds", 1986, Second Edition, pp. 1-326.

Stirling et al. "An Electronegativity-Induced Spin Repulsion Effect", J. Phys. Chem. A, 2005, vol. 109, No. 37, pp. 8385-8390.

Stüger et al., "Aminochlorodisilanes: precursors to multifunctionalized disilane derivatives", Journal of Organometallic Chemistry, 1997, vol. 547, pp. 227-233.

Stüger et al., "Darstellung und spektroskopische Charakterisierung verzweigter funktioneller Hexasilangerüste", Journal of Organometallic Chemistry, 1993, vol. 450, pp. 79-84.

Written Opinion issued Aug. 21, 2019 in PCT/EP2019/064918, 8 Pages.

* cited by examiner

PARTIALLY HYDROGENATED CHLOROSILANES AND METHODS FOR PREPARING SAME BY SELECTIVE HYDROGENATION

CROSS-REFERENCE TO RELATED APPLICATIONS

This application is the National Stage entry under § 371 of International Application No. PCT/EP2019/064918, filed on Jun. 7, 2019, and which claims the benefit of European Application No. 18180840.3, filed on Jun. 29, 2018. The content of each of these applications is hereby incorporated by reference in its entirety.

BACKGROUND OF THE INVENTION

Field of the Invention

The present invention relates to a method for preparing partially hydrogenated chlorosilanes by selective hydrogenation. The present invention further refers to partially hydrogenated chlorosilanes prepared with said method, in particular to partially hydrogenated chlorosilanes represented by the formula $Cl_3SiSi(SiH_3)_3$, $(Cl_3Si)_2Si(SiH_3)_2$ or $HSi(SiH_3)_2SiCl_3$.

Description of Related Art

In the present invention, partially hydrogenated chlorosilanes are compounds comprising silicon, hydrogen and chlorine atoms. Partially hydrogenated chlorosilanes are significantly more reactive than chlorosilanes, which only include silicon and chlorine atoms. Therefore, partially hydrogenated chlorosilanes have considerable potential as precursors in the deposition of silicon-containing layers from the gas phase. Nevertheless, only a few methods for the synthesis of this compound class can be found in the literature.

Processes known from the state of the art for the catalytic conversion of $SiCl_4$ to $HSiCl_3$ with $H_2$ or HCl are not suitable for analogous reactions of higher chlorosilanes meaning chlorosilanes having more than one Si-group such as $Si_2Cl_6$. Si—Si bonds are not stable under the required reaction conditions (T>500° C.) resulting that an increased amount of partially hydrogenated chloromonosilanes are formed.

U. Patzold, G. Roewer, U. Herzog, *J. Organomet. Chem.* 1996, 508, 147 describes partial hydrogenation of chloromonosilanes with $Bu_3SnH$ in the presence of Lewis bases used as catalysts. However, U. Herzog, G. Roewer, U. Patzold, *J. Organomet. Chem.* 1995, 494, 143 describes the corresponding conversion of higher chlorosilanes provides considerable amounts of monosilanes and complex mixtures of various partially hydrogenated chlorosilanes, which significantly impedes the separation into the individual components.

Partially hydrogenated chlorosilanes can also be prepared by using appropriate protective groups, which are cleaved after hydrogenation. K. Hassler, W. Koell, *J. Organomet. Chem.* 1997, 540, 113 and K. Hassler, W. Koell, K. Schenzel, *J Mol. Structure* 1995, 348, 353 describe the synthesis of numerous partially hydrogenated chlorosilanes, which have two or three Si-groups. Higher chlorosilanes having phenyl protection groups are partially hydrogenated and the phenyl protection group of the corresponding partially hydrogenated chorosilane is cleaved by anhydrous HCl.

Similarly, H. Stüger, *J. Organomet. Chem.* 1993, 458, 1, H. Stüger, P. Lassacher, *J. Organomet. Chem.* 1993, 450, 79 and H. Stüger, P. Lassacher, E. Hengge, *J. Organomet. Chem.* 1997, 547, 227 describe the preparation of partially hydrogenated chlorosilanes, which have four or six Si-groups, with the use of protective groups. The use of amino substituents as the protective group is successfully shown.

All the methods above have one of the following disadvantageous characteristics. In the course of the reaction, a significant proportion of Si—Si bond cleavage occurs, resulting in an increased amount of undesired mono-Si species. Complex mixtures of different partially hydrogenated chlorosilanes are obtained, making it difficult to isolate significant amounts of a single compound. Moreover, multistage syntheses with the use of protective groups are not economically applicable.

Another method to achieve partially hydrogenated chlorosilanes is the partial chlorination of hydridosilanes. Hydridosilanes are compounds containing only silicon and hydrogen atoms. J. E. Drake, N. Goddard, *J. Chem. Soc. A* 1970, 2587 describes the successful conversion of higher hydridosilanes meaning hydridosilanes having more than one Si-atom such as $Si_2H_6$ with $BCl_3$ for the preparation of higher partially hydrogenated chlorosilanes. J. E. Drake, N. Goddard, N. P. C. Westwood, *J. Chem. Soc. A* 1971, 3305 shows that high concentrations of $BCl_3$ lead to increasing quantities of by-products due to Si—Si bond cleavage.

R. P. Hollandsworth, M. A. Ring, *Inorg. Chem.* 1968, 7, 1635 describes the preparation of hydrogenated chlorosilanes by use of $HCl/AlCl_3$ and AgCl with higher hydridosilanes. The use of $SnCl_4$ as chlorinating agent for higher hydridosilanes is also suitable for the production of partially hydrogenated chlorosilanes.

From an economic point of view, however, the above-mentioned methods using partial chlorination of hydridosilanes are not very suitable for the preparation of partially hydrogenated chlorosilanes since in many cases the hydridosilanes must first be prepared from the corresponding chlorosilanes by complete hydrogenation.

SUMMARY OF THE INVENTION

It is thus an object of the present invention to avoid the described disadvantages of the prior art. More particularly, it is an object of the present invention to provide a method with which partially hydrogenated chlorosilanes can be prepared rapidly and in a high yield, without the formation of by-products caused by Si—Si bond cleavage. It is further desirable to facilitate the isolation of a single compound by reducing the formation of said by-products. Moreover, it is an object of the present invention to enable the preparation and isolation of partially hydrogenated chlorosilanes which have yet not been synthesized, in particular of partially hydrogenated chlorosilanes represented by the formula $Cl_3SiSi(SiH_3)_3$, $(Cl_3Si)_2Si(SiH_3)_2$ or $HSi(SiH_3)_2SiCl_3$.

DETAILED DESCRIPTION OF THE INVENTION

Figure 1:
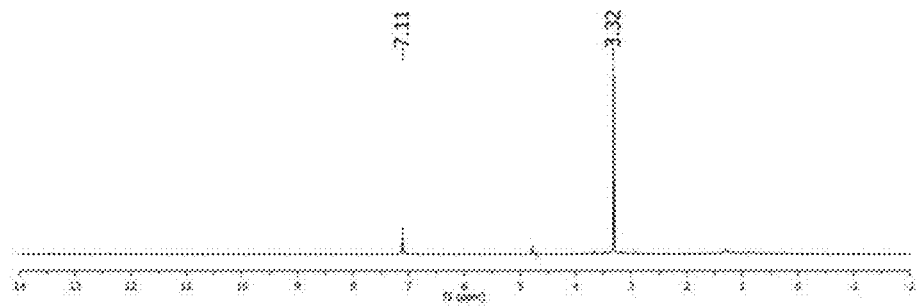
FIG. 1 shows the $^1$H-NMR spectrum of the compound $Cl_3SiSi(SiH_3)_3$ dissolved in $C_6D_6$ measured at 25° C.

It has now surprisingly been found that the object of the present invention is met by the method for preparing a partially hydrogenated chlorosilane by selective hydrogenation of the present invention. The method of the present invention comprises (i) reacting an educt chlorosilane of formula Si$_n$X$_{2n+2}$, wherein n is an integer of at least 2, and X is independently selected from H, Cl, alkyl and aryl, with the proviso that at least two chloro substituents are present, with a hydrogenation agent to form a reaction product comprising a partially hydrogenated chlorosilane, wherein compared to the educt chlorosilane at least one chloro substituent but not all chloro substituent is/are transferred to a hydrido substituent. The hydrogenation agent of the present invention is a compound of formula R$_2$AlH, wherein R is a branched hydrocarbon or a cyclic hydrocarbon. According to the present invention the hydrogenation agent is present in a sub-stoichiometric amount relative to the chloro substituents present in the educt chlorosilane. The method for preparing a partially hydrogenated chlorosilane by selective hydrogenation of the present invention further comprises (ii) separating said partially hydrogenated chlorosilane from the reaction product.

The method of the present invention provides an easy preparation method for partially hydrogenated chlorosilanes in relatively high yields. Compared to the state of the art methods for preparing partially hydrogenated chlorosilanes, the method according to the present invention is more selective and has fewer by-products since Si—Si bond cleavage is reduced. In addition, previously inaccessible compounds can be synthesized for the first time.

This is even more surprising since metal hydrides have only been used so far for complete hydrogenation of chlorosilanes yielding hydridosilanes. Moreover, other commonly known hydrogenation agents used for the complete hydrogenation of chlorosilanes, such as LiAlH$_4$, always lead to complete hydrogenation of the applied chlorosilanes, even when used in sub-stoichiometric amounts relative to the chloro substituents present in the applied chlorosilane. This has been demonstrated by U. Herzog, G. Roewer, U. Pätzold, J. Organomet. Chem. 1995, 494, 143 and U. Pätzold, G. Roewer, U. Herzog, J. Organomet. Chem. 1996, 508, 147 describing the complete hydrogenation of SiCl$_4$, Si$_2$Cl$_6$, or methyl chloro disilane with sub-stoichiometric amounts of LiAlH$_4$. Furthermore, P. Gaspar, C. Levy, G. Adair, Inorg. Chem. 1970, 9, 1272 and F. Hoefler, R. Jannach, Inorg. Nucl. Chem. Lett. 1973, 9, 723 describe an increased Si—Si bond cleavage of Si$_3$Cl$_8$ and Si$_5$Cl$_{12}$ when LiAlH$_4$ is used.

In terms of the present invention the term "partially hydrogenated chlorosilanes" refers to chlorosilane of formula Si$_n$X$_{2n+2}$, wherein n is an integer of at least 2, and X includes H, Cl, alkyl or aryl, with the proviso that at least one chloro substituent is present.

In terms of the present invention the term "selective hydrogenation" refers to highly specific hydrogenation of the educt chlorosilanes. Herein, hydrogenation refers to an exchange of a chloro substituent of a Si-group by a hydrido substituent. Without wishing to be bound by theory, it is believed that the SiCl$_3$-groups of the educt chlorosilane of the present invention are successively converted into SiH$_3$ groups by selective hydrogenation according to the present invention.

Herein, the term "educt chlorosilane" refers to the chlorosilane of the present application as a substance that provides a starting material for the method of the present invention.

According to the present invention the term "sub-stoichiometric amount" means that the hydrogenation agent is present less than the stoichiometric amount of chloro substituents present in the educt chlorosilane.

Herein, the educt chlorosilane of formula Si$_n$X$_{2n+2}$, wherein n is an integer of at least 2, and X is independently selected from H, Cl, alkyl and aryl, with the proviso that at least two chloro substituents are present, may be gaseous, liquid or solid according to the present invention.

Preferably educt chlorosilanes of formula Si$_n$X$_{2n+2}$ with n being 2 to 10 are used for the method of the present invention and even more preferably educt chlorosilanes of formula Si$_n$X$_{2n+2}$ with n being 2 to 6, most preferably n being 4 to 6. X can independently be selected from H or Cl, and preferably X is Cl according to the present invention. Moreover, the educt chlorosilane of the present invention can be linear or branched.

Very particular preference is given to the educt chlorosilane of the present invention which comprises at least two SiCl$_3$-groups, which result in formation of partially hydrogenated chlorosilane comprising at least one SiCl$_3$-group and at least one SiH$_3$-group when reacted with the hydrogenation agent of the present invention.

In a preferred embodiment, the educt chlorosilanes can preferably be selected from a group comprising Si(SiCl$_3$)$_4$, HSi(SiCl$_3$)$_3$, Cl$_3$SiSiCl$_2$SiCl$_3$ and Cl$_3$SiSiCl$_3$.

The hydrogenation agent of the present invention is a compound of formula R$_2$AlH, wherein R is a branched hydrocarbon or a cyclic hydrocarbon. The best results can be achieved when R is iso-propyl, iso-butyl, sec-butyl, tert-butyl, iso-pentyl, 2,6-dimethylphenyl, mesityl (Mes), 2,6-bis-iso-propylphenyl, 2,4,6-tris-iso-propylphenyl, 2,4,6-tris-tert-butylphenyl (Mes*), 2,4,6-Triphenylphenyl (Trip), 2,6-Mes(C$_6$H$_3$) or 2,6-Trip(C$_6$H$_3$).

Even further preferably, the hydrogenation agent used in the method of the present invention is diisobutylaluminium hydride.

The reaction (i) of the preparation of partially hydrogenated chlorosilanes by selective hydrogenation is preferably carried out at a temperature in the range of −70° C. to 100° C., more preferably in the range of −50° C. to 80° C., even more preferably in the range of −30° C. to 60° C. The reaction (i) is particularly carried out at a temperature of 0° C. Optionally, pressures of 500 mbar to 5 bar can be applied in the reaction (i) of the preparation of partially hydrogenated chlorosilanes by selective hydrogenation.

In the reaction (i) of the present invention, the hydrogenation agent is preferably used in an amount of about m-k mols per mol of the educt chlorosilane. According to the present invention, m is the number of chloro substituents in the educt chlorosilane and k is the number of chloro substituents in the partially hydrogenated chlorosilane.

After the formation of the reaction product comprising a partially hydrogenated chlorosilane in the reaction step (i) of the present invention, the formed partially hydrogenated chlorosilane is separated. The separation (ii) may comprise evaporating or distillation, wherein distillation is preferred. The distillation is preferably carried out at a temperature in the range of −30° C. to 100° C. and at a pressure in the range of 0.01 mbar to 1100 mbar.

The reaction (i) can be carried out in the presence or absence of a solvent. The method according to the present invention is preferably carried out solvent-free. If it is, though, carried out in the presence of a solvent, preferred solvents used may be solvents selected from the group consisting of linear, branched and cyclic, saturated, unsaturated and aromatic hydrocarbons having one to 12 carbon atoms (optionally partially or fully halogenated), and ethers. Particular preference is given to n-pentane, n-hexane, n-heptane, n-octane, n-decane, dodecane, cyclohexane, cyclooctane, cyclodecane, dicyclopentane, benzene, toluene, m-xylene, p-xylene, mesitylene, tetrahydronaphthalene, decahydronaphthalene, diethyl ether, dipropyl ether, ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, tetrahydrofuran, p-dioxane, and dimethyl sulfoxide. Solvents usable particularly efficiently are the hydrocarbons n-pentane, n-hexane, n-hexane, n-octane, n-decane, dodecane, cyclohexane, cyclooctane, cyclodecane, benzene, toluene, m-xylene, p-xylene, mesitylene. The solvent may make up 0.01 to 90% by weight of the total mass.

Preferred reaction times of the reaction (i) are between 0.1 and 12 h, further preferably between 1 and 8 h, particularly preferably between 2 and 6 h.

The present invention further relates to a chlorosilane represented by the formula $Cl_3SiSi(SiH_3)_3$, $(Cl_3Si)_2Si(SiH_3)_2$ or $HSi(SiH_3)_2SiCl_3$.

The formed partially hydrogenated chlorosilanes of the present invention can be used in the production of silicon-containing layers by gas phase deposition since said partially hydrogenated chlorosilanes have low deposition temperatures.

The examples which follow are intended to further illustrate the subject-matter of the present invention, without themselves having a restrictive effect.

LIST OF FIGURES

FIG. 1: $^1$H-NMR spectrum of the compound $Cl_3SiSi(SiH_3)_3$ dissolved in $C_6D_6$ measured at 25° C.

Figure 2:
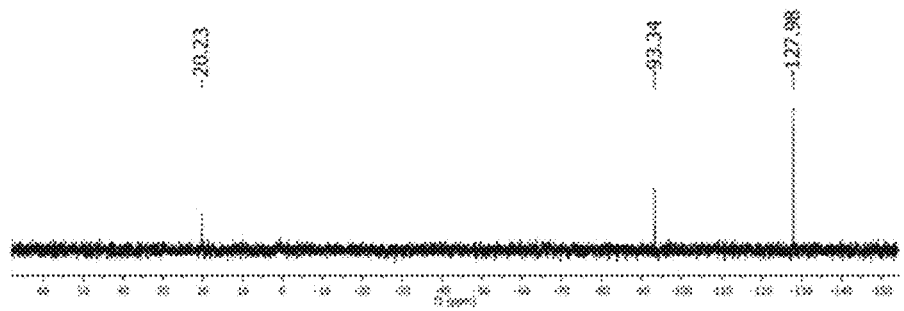
FIG. 2 shows the proton decoupled $^{29}Si\{^1H\}$-NMR spectrum of the compound $Cl_3SiSi(SiH_3)_3$ dissolved in $C_6D_6$ measured at 25° C.

FIG. 2: Proton decoupled $^{29}Si\{^1H\}$-NMR spectrum of the compound $Cl_3SiSi(SiH_3)_3$ dissolved in $C_6D_6$ measured at 25° C.

Figure 3:
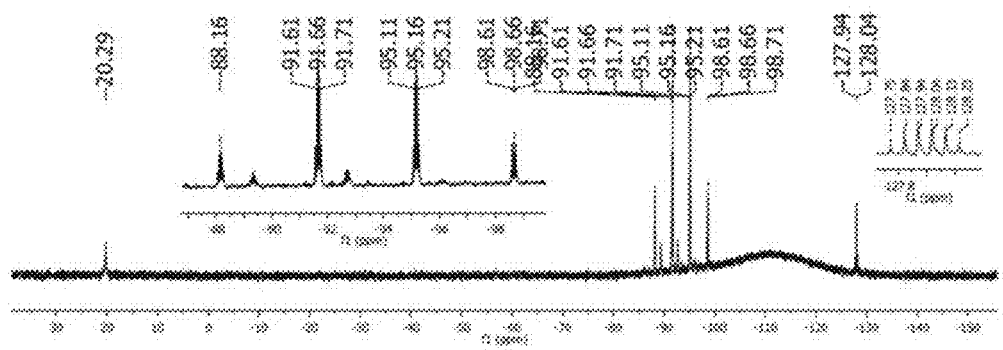
FIG. 3 shows the proton coupled $^{19}$Si-NMR spectrum of the compound $Cl_3SiSi(SiH_3)_3$ dissolved in $C_6D_6$ measured at 25° C.

FIG. 3: Proton coupled $^{29}Si$-NMR spectrum of the compound $Cl_3SiSi(SiH_3)_3$ dissolved in $C_6D_6$ measured at 25° C.

Figure 4:
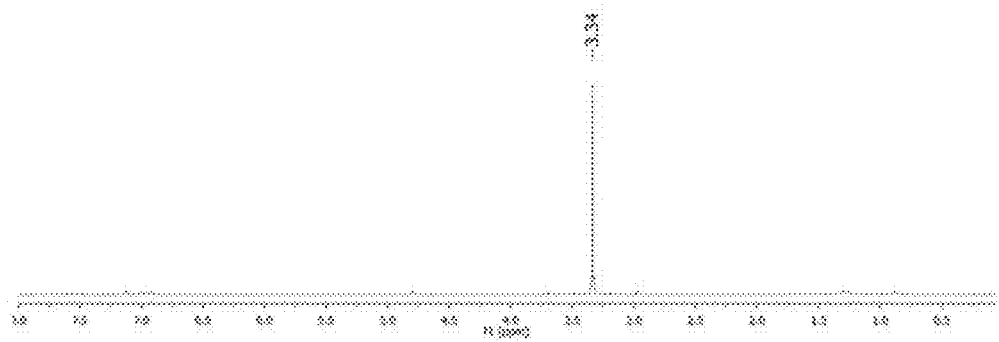
FIG. 4 shows the $^1$H-NMR spectrum of the compound (Cl$_3$Si)$_2$Si(SiH$_3$)$_2$ dissolved in C$_6$D$_6$ measured at 25° C.

FIG. 4: $^1$H-NMR spectrum of the compound $(Cl_3Si)_2Si(SiH_3)_2$ dissolved in $C_6D_6$ measured at 25° C.

Figure 5:
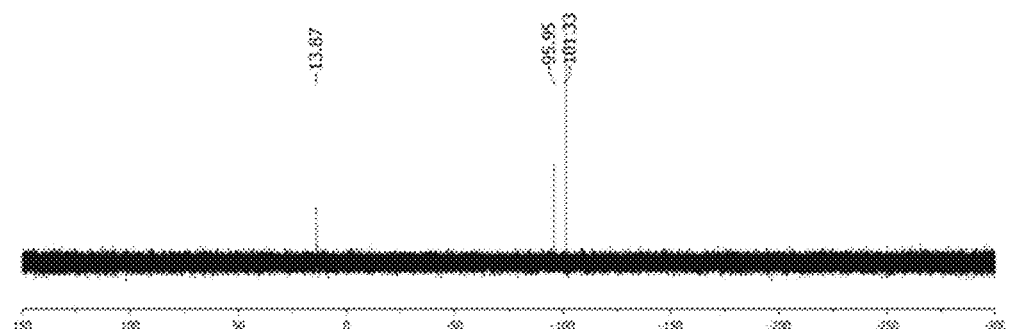
FIG. 5 shows the proton decoupled $^{29}$Si {$^1$H}-NMR spectrum of the compound (Cl$_3$Si)$_2$Si(SiH$_3$)$_2$ dissolved in C$_6$D$_6$ measured at 25° C.

FIG. 5: Proton decoupled $^{29}Si\{^1H\}$-NMR spectrum of the compound $(Cl_3Si)_2Si(SiH_3)_2$ dissolved in $C_6D_6$ measured at 25° C.

Figure 6:
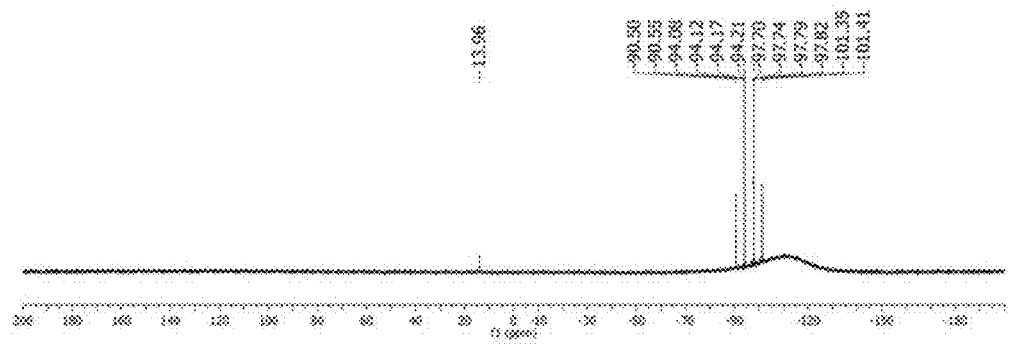
FIG. 6 shows the proton coupled $^{29}$Si-NMR spectrum of the compound (Cl$_3$Si)$_2$Si(SiH$_3$)$_2$ dissolved in C$_6$D$_6$ measured at 25° C.

FIG. 6: Proton coupled $^{29}Si$-NMR spectrum of the compound $(Cl_3Si)_2Si(SiH_3)_2$ dissolved in $C_6D_6$ measured at 25° C.

Figure 7:
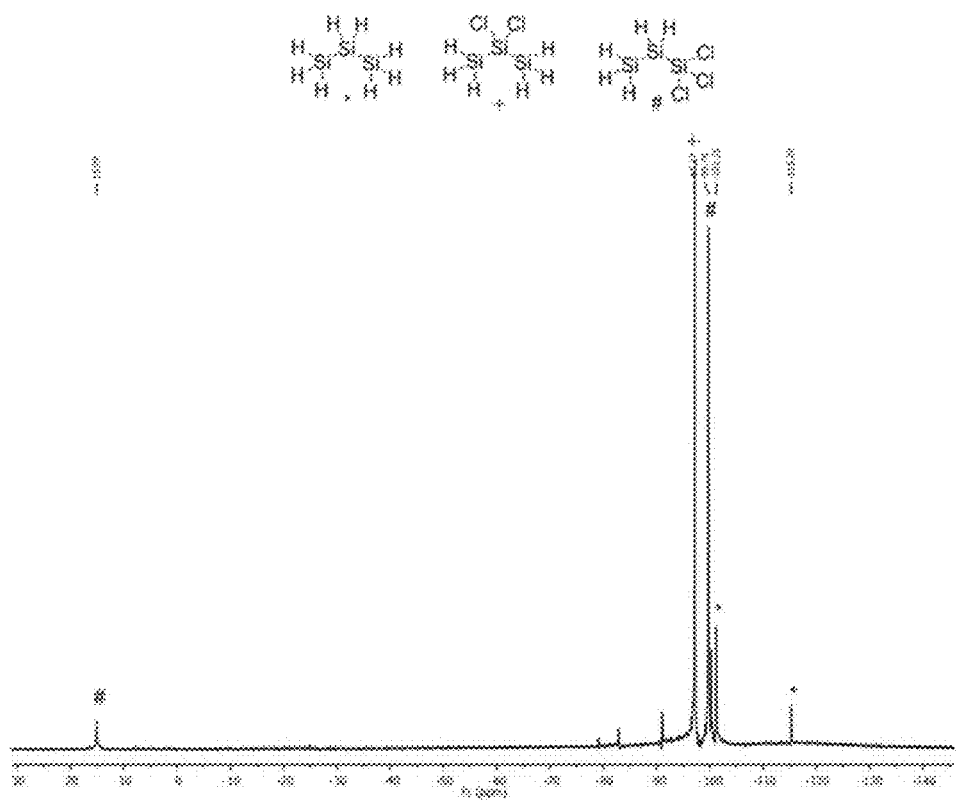
FIG. 7 shows the proton decoupled $^{29}$Si{$^1$H}-NMR spectrum of the raw product mixture of example 4 dissolved in C$_6$D$_6$ measured at 25° C.

FIG. 7: Proton decoupled $^{29}Si\{^1H\}$-NMR spectrum of the raw product mixture of example 4 dissolved in $C_6D_6$ measured at 25° C.

Figure 8:
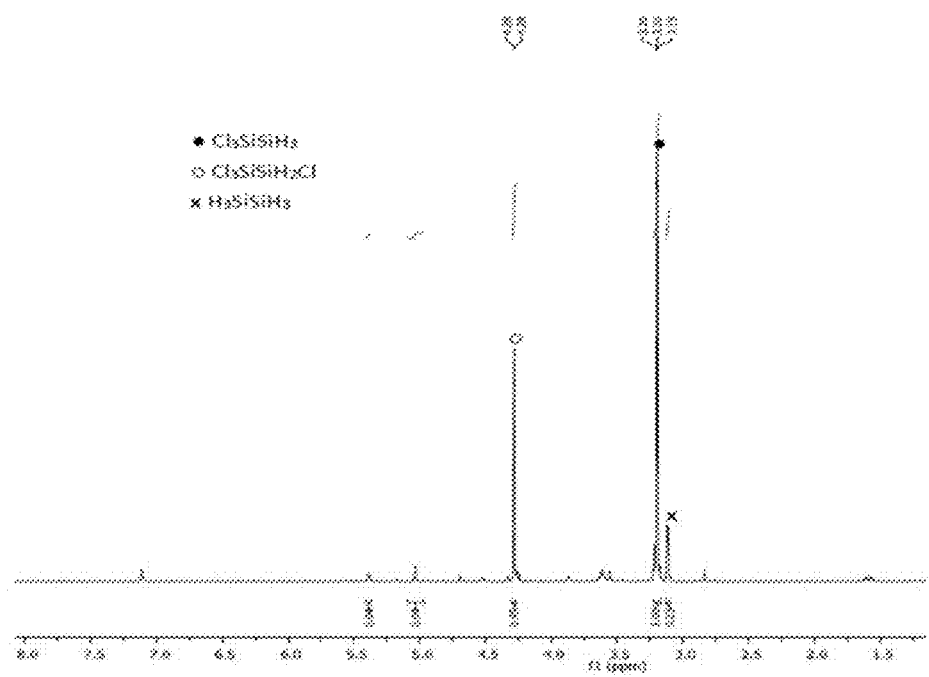
FIG. 8 shows the $^1$H-NMR spectrum of the raw product mixture of example 5 dissolved in C$_6$D$_6$ measured at 25° C.

FIG. 8: $^1$H-NMR spectrum of the raw product mixture of example 5 dissolved in $C_6D_6$ measured at 25° C.

Figure 9:
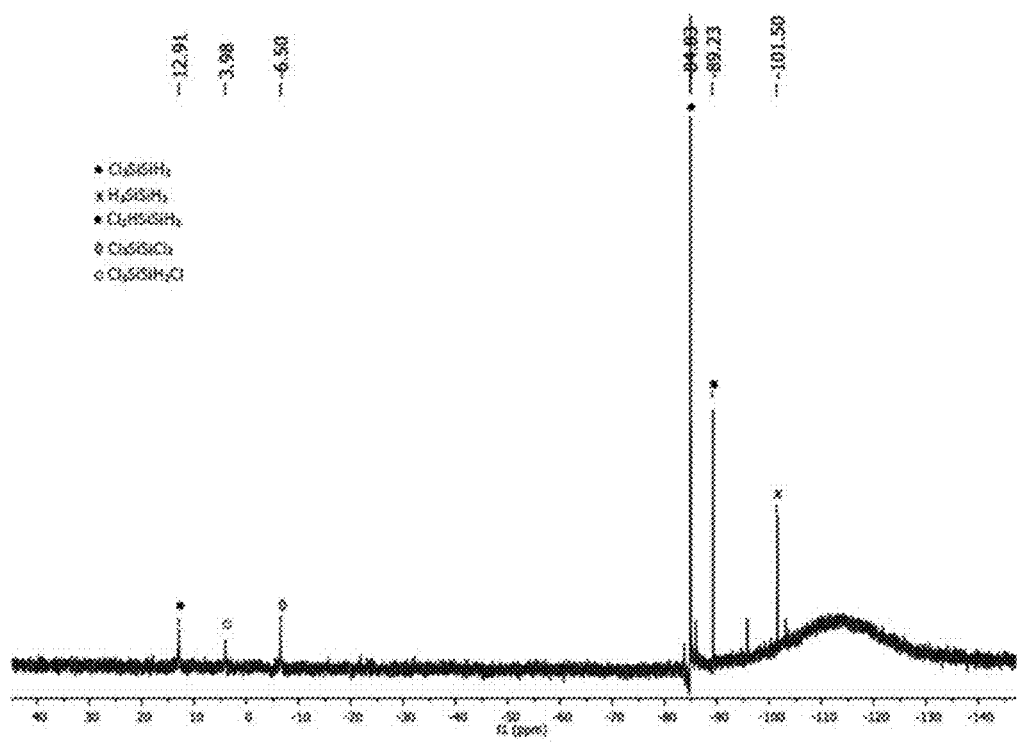
FIG. 9 shows the proton decoupled $^{29}$Si{$^1$H}-NMR spectrum of the raw product mixture of example 5 dissolved in C$_6$D$_6$ measured at 25° C.

FIG. 9: Proton decoupled $^{29}Si\{^1H\}$-NMR spectrum of the raw product mixture of example 5 dissolved in $C_6D_6$ measured at 25° C.

EXAMPLES

All experiments were carried out in a glovebox (manufactured by M. Braun Inert Gas Systemes GmbH) or by using methods of the standard Schlenk technique (according to the methods of D. F. Shriver, M. A. Drezdzon, *The manipulation of air sensitive compounds*, 1986, Wiley VCH, New York, USA) under an inert atmosphere of dry nitrogen ($N_2$, purity 5.0; $O_2$ content <0.1 ppm; $H_2O$ content <10 ppm). Dry and oxygen-free solvents (diethyl ether, pentane) were prepared using a solvent drying system of the type MB-SPS-800-Auto (manufactured by M. Braun Inert Gas Systemes GmbH). Deuterated benzene ($C_6D_6$) was obtained from Sigma-Aldrich Coorp. and stored on molecular sieve for drying for at least 2 days before use.

Compounds $Si(SiCl_3)_4$ and $HSi(SiCl_3)_3$ were produced according to known methods (DE102009053804B3 and U.S. Pat. No. 8,575,381B2).

NMR spectra were measured in solution using $C_6D_6$ as the solvent. Varian 25 INOVA 300 (1H: 300.0 MHz, 29Si: 59.6 MHz) spectrometer from Varian, Inc. at 25° C. was used. Chemical shifts are given in comparison to an external reference ($^1$H and $^{29}$Si: TMS, corresponding to tetramethylsilane, for δ=0 ppm). NMR spectra were interpreted using the software MestReNova from MestreLab Research, Chemistry Software Solutions.

Infrared spectra were measured of solid samples using a Bruker Alpha-P Diamond ATR spectrometer.

Elemental analyses were performed on a Hanau Vario Elementar EL.

Mass spectroscopic and gas chromatographic analyses were performed by coupling HP 5971 and 5890-II instruments. A capillary column type HP 1 with a length of 25 m, a diameter of 0.2 mm and a filling with 0.33 mm polydimethylsiloxane particles was used.

Example 1

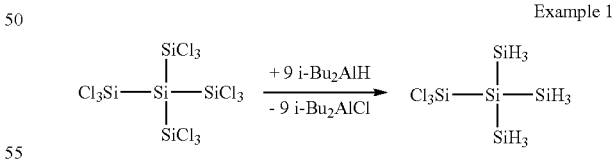

204 mL (1145 mmol) i-$Bu_2AlH$ was added over a period of several hours at a temperature of 0° C. to 72 g (127 mmol) $Si(SiCl_3)_4$ (dodecachloroneopentasilane). The suspension formed at the beginning of the addition changed into a clear solution during the reaction. After addition was completed, the reaction mixture was stirred overnight at room temperature (23° C.). The reaction progress was monitored by $^1$H und $^{29}$Si-NMR spectroscopy. The product $Cl_3SiSi(SiH_3)_3$ was isolated from the reaction mixture by distillation at room temperature and a pressure of 0.01 mBar (yield: 7.2 g, 38%).

Elemental analysis: found: H, 3.60%. calculated: H, 3.55%. $^{29}$Si-NMR (C$_6$D$_6$, TMS, ppm): −127.9 ppm (m, Si(SiH$_3$)$_3$, $^2$JSi-H=5.7 Hz); −93.1 ppm (q, $^1$JSi-H=208.6 Hz, $^3$JSi-H=2.9 Hz, SiH$_3$); 20.2 (s, SiCl$_3$). $^1$H-NMR (C$_6$D$_6$, TMS, ppm): 3.32 (s, 9H, SiH$_3$). IR (pur): v(Si—H)=2145 (s) cm$^{-1}$. GC/MS (70 eV): m/z (%) 254.8 (3) [M+], 223.9 (47) [M+−SiH$_3$], 191.8 (100) [M+−2SiH$_3$].

Example 2

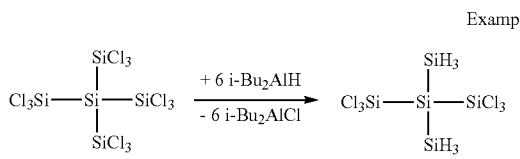

136 mL (762 mmol) i-Bu$_2$AlH was added over a period of several hours at a temperature of 0° C. to 72 g (127 mmol) Si(SiCl$_3$)$_4$ (dodecachloroneopentasilane). The suspension formed at the beginning of the addition changed into a clear solution during the reaction. After addition was completed, the reaction mixture was stirred overnight at room temperature. The reaction progress was monitored by means of $^1$H und $^{29}$Si-NMR spectroscopy. The by-product Cl$_3$SiSi(SiH$_3$)$_3$ was separated from the reaction mixture by distillation at room temperature and a pressure of 0.01 mBar. The main product (Cl$_3$Si)$_2$Si(SiH$_3$)$_2$ was isolated from the reaction mixture by subsequent distillation at 90° C. and a pressure of 0.01 mBar. (yield: 8.2 g, 25%).

To clearly prove that the main product is indeed (Cl$_3$Si)$_2$Si(SiH$_3$)$_2$, said compound was also produced in a second way by using protective groups:

A solution of 1 g (1.64 mmol) (Ph$_3$Si)$_2$Si(SiH$_3$)$_2$ (1,1,1,3,3,3-hexaphenyl neopentasilane) in 15 mL benzene was mixed with a catalytic amount of AlCl$_3$ (2 mg, 1 mol %). The reaction solution was cooled to 0° C. Subsequently, gaseous HCl was passed through the reaction mixture via a gas introduction tube until complete conversion of (Ph$_3$Si)$_2$Si(SiH$_3$)$_2$ was achieved. The reaction start was indicated by a yellowing of the reaction solution. The reaction progress was monitored by $^1$H and $^{29}$Si-NMR spectroscopy measurements. After completion of the reaction, the solvent was removed in vacuo. The residue was mixed with 15 mL pentane. The obtained suspension was filtered to remove AlCl$_3$ from the reaction mixture. After evaporation of pentane at room temperature, the product (Cl$_3$Si)$_2$Si(SiH$_3$)$_2$ was obtained as a colorless, wax-like solid (yield: 0.23 g, 39%).

Elemental analysis: found: H, 1.71%. calculated: H, 1.68%. $^{29}$Si-NMR (C$_6$D$_6$, TMS, ppm): −101.3 ppm (m, Si(SiH$_3$)$_3$); −95.9 ppm (q, $^1$JSi-H=215.8 Hz, $^3$JSi-H=3.6 Hz, SiH$_3$); 13.9 (s, SiCl$_3$). $^1$H-NMR (C$_6$D$_6$, TMS, ppm): 3.34 (s, 6H, SiH$_3$). IR (pur): v(Si—H)=2139 (s) cm$^{-1}$. GC/MS measurements were not possible due to the high chlorine content of the compound.

Example 3

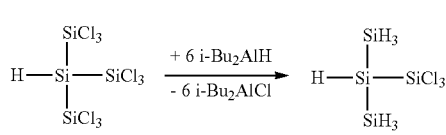

42 mL (222 mmol) i-Bu$_2$AlH was added over a period of several hours at a temperature of 0° C. to 16 g (37 mmol) HSi(SiCl$_3$)$_3$ (1,1,1,3,3,3-hexachloro-2-(trichlorosilyl)trisilane). After addition was completed, the reaction mixture was stirred overnight at room temperature. The reaction progress was monitored by means of $^1$H and $^{29}$Si-NMR spectroscopy. The volatile by-product HSi(SiH$_3$)$_3$ was isolated from the reaction mixture by distillation at room temperature and a pressure of 0.01 mBar. The product HSi(SiH$_3$)$_2$SiCl$_3$ was isolated by subsequent distillation at a temperature of 50° C. and a pressure of 0.01 mBar. (yield: 3.2 g, 38%)

Elemental analysis: found: H, 3.25%. calculated: H, 3.13%. $^{29}$Si-NMR (C$_6$D$_6$, TMS, ppm): −106.0 ppm (dm, Si(SiH$_3$)$_2$, $^2$JSi-H=5.7 Hz); −97.7 ppm (q, $^1$JSi-H=209 Hz, $^3$JSi-H=2.1 Hz, SiH$_3$). $^1$H-NMR (C$_6$D$_6$, TMS, ppm): 3.24 (d, 6H, SiH$_3$), 3.05 (m, 1H, SiH).

Example 4

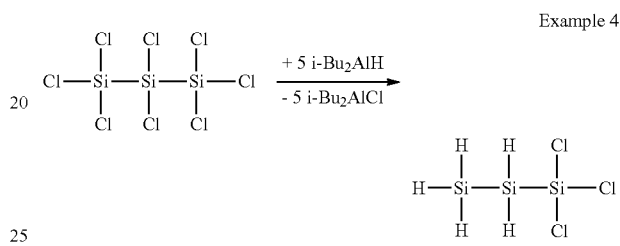

33.9 mL (185 mmol) i-Bu$_2$AlH was added over a period of several hours at a temperature of 0° C. to 10 g (37 mmol) Cl$_3$SiSiCl$_2$SiCl$_3$ (Octachlorotrisilane). Subsequently, partially hydrogenated chlorotrisilanes were separated in vacuo (0.01 mBar) at room temperature. GC-MS measurements of the reaction mixture confirmed that H$_3$SiSiH$_2$SiCl$_3$ was synthesized with a proportion of 75% of the reaction mixture. $^{29}$Si{$^1$F1}-NMR (C$_6$D$_6$, TMS, ppm): −115.3 ppm (s, Si$_3$H$_8$); −101.2 ppm (s, Si$_3$H$_8$); −99.8 (s, H$_3$SiSiH$_2$SiCl$_3$); −97.2 (s, H$_3$SiSiCl$_2$SiH$_3$); 15.9 (s, H$_3$SiSiH$_2$SiCl$_3$).

Example 5

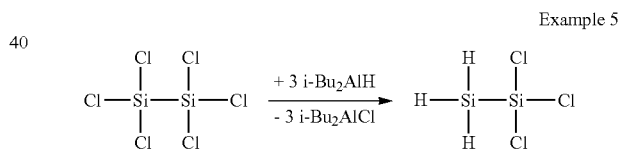

20.7 mL (111 mmol) i-Bu$_2$AlH was added over a period of several hours at a temperature of 0° C. to 10 g (37 mmol) Cl$_3$SiSiCl$_3$ (hexachlorodisilane). Subsequently, partially hydrogenated chlorodisilanes were separated in vacuo (0.01 mBar) at room temperature. The yield of the partially hydrogenated chlorodisilane H$_3$SiSiCl$_3$ was 60%. $^{29}$Si{$^1$H}-NMR (C$_6$D$_6$, TMS, ppm): −101.5 (s, Si$_3$H$_8$), −84.8 (s, H$_3$SiSiCl$_3$), −89.2 ppm (s, Cl$_2$HSiSiH$_3$); −6.5 (s, Cl$_3$SiSiCl$_3$), 4.0 (s, Cl$_3$SiSiH$_2$C$_1$), 12.9 ppm (s, H$_3$SiSiCl$_3$). $^1$H-NMR (C$_6$D$_6$, TMS, ppm): 3.10 (Si$_3$H$_8$), 3.20 (s, H$_3$SiSiCl$_3$), 4.28 (Cl$_3$SiSiH$_2$Cl).

The invention claimed is:
1. A method for preparing a partially hydrogenated chlorosilane by selective hydrogenation, the method comprising:
(i) reacting an educt chlorosilane of formula Si$_n$X$_{2n+2}$, wherein n is an integer of at least 2, and X is independently selected from the group consisting of H and Cl, with the proviso that at least two chloro substituents are present, with a hydrogenation agent to form a reaction product comprising a partially hydrogenated chlorosilane, wherein compared to the educt chlorosilane at least one of the at least two chloro substituents but not all of the at least two chloro substituents is/are transferred to a hydrido substituent; and (ii) separating said partially hydrogenated chlorosilane from the reaction product, wherein the hydrogenation agent is a compound of formula $R_2AlH$, wherein R is a branched hydrocarbon or a cyclic hydrocarbon, and the hydrogenation agent is present in a sub-stochiometric amount relative to the at least two chloro substituents present in the educt chlorosilane.

2. The method of claim 1, wherein n is 2 to 10.

3. The method of claim 1, wherein the educt chlorosilane comprises at least two $SiCl_3$-groups.

4. The method of claim 3, wherein the partially hydrogenated chlorosilane comprises at least one $SiCl_3$-group and at least one $SiH_3$-group.

5. The method of claim 1, wherein the educt chlorosilane is selected from the group consisting of $Si(SiCl_3)_4$, $HSi(SiCl_3)_3$, $Cl_3SiSiCl_2SiCl_3$, and $Cl_3SiSiCl_3$.

6. The method of claim 1, wherein R is selected from the group consisting of iso-propyl, iso-butyl, sec-butyl, tert-butyl, iso-pentyl, 2,6-dimethylphenyl, mesityl (Mes), 2,6-bis-iso-propylphenyl, 2,4,6-tris-iso-propylphenyl, 2,4,6-tris-tert-butylphenyl (Mes*), 2,4,6-Triphenylphenyl (Trip), 2,6-Mes($C_6H_3$), and 2,6-Trip($C_6H_3$).

7. The method of claim 1, wherein the hydrogenation agent is diisobutylaluminium hydride.

8. The method of claim 1, wherein the reaction (i) is carried out at a temperature in the range of −70° C. to 100° C.

9. The method of claim 1, wherein the hydrogenation agent is used in an amount of about m−k mols per mol of the educt chlorosilane, wherein m is the number of the at least two chloro substituents in the educt chlorosilane and k is the number of the at least two chloro substituents in the partially hydrogenated chlorosilane.

10. The method of claim 1, wherein the separation (ii) is carried out by distillation.

11. The method of claim 1, wherein the reaction (i) is solvent-free.

12. The method of claim 1, wherein reaction times of (i) are between 0.1 and 12 h.

13. A chlorosilane represented by the formula $Cl_3SiSi(SiH_3)_3$, $(Cl_3Si)_2Si(SiH_3)_2$ or $HSi(SiH_3)_2SiCl_3$.

14. The method of claim 2, wherein n is 2 to 6.

15. The method of claim 1, wherein X is Cl.

16. The method of claim 8, wherein the reaction (i) is carried out at a temperature of 0° C.

17. The method of claim 10, wherein the separation (ii) is carried out by distillation at a temperature in the range of −30° C. to 100° C. and at a pressure in the range of 0.01 mbar to 1100 mbar.

18. The method of claim 12, wherein reaction times of (i) are between 2 and 6 h.

19. The method of claim 1, wherein n is an integer of at least 3.

* * * * *